United States Patent
Komninos (10) Patent No.: US 8,468,874 B2
(45) Date of Patent: Jun. 25, 2013

(54) LASER INDICATOR FOR REMOTE MEASURING DEVICES AND METHODS THEREFOR

(75) Inventor: Nikolaos I. Komninos, Littleton, CO (US)

(73) Assignee: Radiaulics, Inc., Littleton, CO (US)

(*) Notice: Subject to any disclaimer, the term of this patent is extended or adjusted under 35 U.S.C. 154(b) by 976 days.

(21) Appl. No.: 12/027,191

(22) Filed: Feb. 6, 2008

(65) Prior Publication Data

US 2009/0193875 A1 Aug. 6, 2009

(51) Int. Cl.
*G01M 3/38* (2006.01)

(52) U.S. Cl.
USPC .............................................. 73/40

(58) Field of Classification Search
USPC ............................................ 73/52, 40–49.8
See application file for complete search history.

(56) References Cited

U.S. PATENT DOCUMENTS

| | | | |
|---|---|---|---|
| 2,435,031 A | 1/1948 | Burns et al. | |
| 2,900,039 A | 8/1959 | Burnett | |
| 3,089,333 A | 5/1963 | Kleesattel | |
| 3,098,379 A | 7/1963 | Crawford | |
| 3,308,647 A | 3/1967 | Crawford | |
| 3,375,707 A | 4/1968 | Neitz | |
| 3,477,280 A | 11/1969 | Blackmer | |
| 3,494,180 A | 2/1970 | Hansel | |
| 3,500,676 A | 3/1970 | Palmer | |
| 3,555,894 A | 1/1971 | Bratkowski | |
| 3,592,967 A | 7/1971 | Harris | |
| 3,597,263 A * | 8/1971 | Bancraft et al. | 422/429 |
| 3,784,754 A | 1/1974 | Hagiwara et al. | |
| 3,978,915 A | 9/1976 | Harris | |
| 3,991,360 A | 11/1976 | Orth et al. | |
| 4,011,472 A | 3/1977 | Feng | |
| 4,045,729 A | 8/1977 | Loh | |
| 4,130,734 A | 12/1978 | Lee | |
| 4,408,533 A | 10/1983 | Owen et al. | |
| 4,416,145 A | 11/1983 | Goodman et al. | |
| 4,430,611 A | 2/1984 | Boland | |
| 4,455,863 A | 6/1984 | Huebler et al. | |
| 4,461,022 A | 7/1984 | Slagley | |
| 4,462,249 A | 7/1984 | Adams | |
| 4,612,620 A | 9/1986 | Davis et al. | |
| 4,818,348 A | 4/1989 | Stetter | |

(Continued)

FOREIGN PATENT DOCUMENTS

| | | |
|---|---|---|
| EP | 0837328 A2 | 4/1998 |
| JP | 62159041 A | 7/1987 |

(Continued)

OTHER PUBLICATIONS

International Searching Authority "Notification of Transmittal of the International Search Report and the Written Opinion of the International Searching Authority, or the Declaration" dated Apr. 15, 2009.

*Primary Examiner* — David Rogers (74) *Attorney, Agent, or Firm* — Holland & Hart LLP (57) ABSTRACT

Provided is a device for use in locating the origin of a phenomenon of interest, including a sensor capable of detecting the presence of the phenomenon of interest and generating a detection signal in response thereto. The device also includes a phenomenon origin locator to monitor the detection signal and project light toward the origin when the detection signal satisfies a selected criteria level, thereby indicating the origin of the phenomenon of interest.

7 Claims, 6 Drawing Sheets

U.S. PATENT DOCUMENTS

| | | | |
|---|---|---|---|
| 4,918,382 A | 4/1990 | Bales et al. | |
| 4,922,754 A | 5/1990 | Horne et al. | |
| 5,079,735 A | 1/1992 | Apostolos | |
| 5,089,997 A | 2/1992 | Pecukonis | |
| 5,103,675 A | 4/1992 | Komninos | |
| 5,104,513 A | 4/1992 | Lee et al. | |
| RE33,977 E | 6/1992 | Goodman et al. | |
| 5,161,408 A * | 11/1992 | McRae et al. | 73/40.7 |
| 5,214,412 A * | 5/1993 | Gavlak et al. | 340/632 |
| 5,369,983 A | 12/1994 | Grenfell | |
| 5,372,426 A * | 12/1994 | Broudy et al. | 374/127 |
| 5,432,755 A | 7/1995 | Komninos | |
| 5,436,556 A | 7/1995 | Komninos | |
| 5,445,026 A | 8/1995 | Eagan | |
| 5,452,264 A | 9/1995 | Holroyd | |
| 5,546,809 A | 8/1996 | Cotton | |
| 5,561,344 A | 10/1996 | Hsi | |
| 5,631,426 A | 5/1997 | Jao | |
| 5,663,504 A | 9/1997 | Kluft | |
| 5,691,707 A | 11/1997 | Smith et al. | |
| 5,703,295 A | 12/1997 | Ishida et al. | |
| 5,731,510 A | 3/1998 | Jones et al. | |
| 5,845,230 A | 12/1998 | Lamberson | |
| 5,892,446 A * | 4/1999 | Reich | 340/573.1 |
| 5,932,176 A | 8/1999 | Yannopoulos et al. | |
| 5,945,603 A | 8/1999 | Shih | |
| 5,992,237 A | 11/1999 | McCarty et al. | |
| 6,053,047 A | 4/2000 | Dister et al. | |
| 6,058,076 A | 5/2000 | Komninos | |
| 6,079,275 A | 6/2000 | Komninos | |
| 6,163,504 A | 12/2000 | Komninos et al. | |
| 6,189,384 B1 | 2/2001 | Piety et al. | |
| 6,205,872 B1 | 3/2001 | Pflueg | |
| 6,234,021 B1 | 5/2001 | Piety et al. | |
| 6,244,108 B1 * | 6/2001 | McInnes et al. | 73/462 |
| 6,289,735 B1 | 9/2001 | Dister et al. | |
| 6,321,602 B1 | 11/2001 | Ben-Romdhane | |
| 6,509,562 B1 | 1/2003 | Yang et al. | |
| 6,598,479 B1 | 7/2003 | Robinson et al. | |
| 6,629,932 B2 | 10/2003 | Weber et al. | |
| 6,647,761 B2 * | 11/2003 | Barjesteh | 73/40 |
| 6,659,639 B2 | 12/2003 | Hollander et al. | |
| 7,051,577 B2 | 5/2006 | Komninos | |
| 7,075,653 B1 * | 7/2006 | Rutherford | 356/437 |
| 7,134,322 B1 * | 11/2006 | Baird | 73/40.7 |
| 7,193,696 B2 * | 3/2007 | Engelbart et al. | 356/237.1 |
| 2002/0000126 A1 | 1/2002 | Barclay | |
| 2002/0057830 A1 * | 5/2002 | Akin et al. | 382/147 |
| 2003/0159495 A1 | 8/2003 | Cardinale et al. | |
| 2004/0005715 A1 | 1/2004 | Schabron et al. | |
| 2004/0050188 A1 | 3/2004 | Richards et al. | |
| 2004/0189944 A1 | 9/2004 | Kaufman et al. | |
| 2005/0201444 A1 | 9/2005 | Hollander et al. | |
| 2006/0250237 A1 * | 11/2006 | Whitten et al. | 340/541 |

FOREIGN PATENT DOCUMENTS

| | | |
|---|---|---|
| JP | 4325489 | 11/1992 |
| JP | 06235676 A * | 8/1994 |
| WO | WO 98/01831 | 1/1998 |

* cited by examiner

LASER INDICATOR FOR REMOTE MEASURING DEVICES AND METHODS THEREFOR

BACKGROUND

There are many applications in which the remote detection of an event or the measurement of a quantity from a distance requires ascertaining the origin location of the event. An example of this application is the now common infrared thermometer with a laser pointer incorporated within. With an infrared thermometer, the user activates the thermometer to take a reading. The laser pointer indicates the spot where the measurement is taking place. Some infrared thermometers allow the user to select if the laser pointer is active during the measurement or not but the activation still takes place with the on/off switch. Another instrument that reads from a distance is the ultrasonic leak detector such as in my previous U.S. Pat. No. 7,051,577, where the location of a distant target is pointed to by a laser pointer incorporated in the leak detector. In this case, the laser pointer is usually in a parabolic dish, sometimes called a long-range module. Similar to an infrared thermometer, the leak detector offers the user the option to activate the laser pointer. Yet another example of an instrument that takes measurements at a distance is a thermographic camera. Some of these thermographic cameras also incorporate a laser pointer. It should be appreciated that these applications are just some of the examples of instruments incorporating laser pointers. All of these instruments, however, use the laser pointer passively much like laser pointers used in presentations. The user activates the laser pointer to identify the target or the point of interest either using a dedicated control or the on/off button for control of the instrument.

Improvements have been made to the basic laser pointing systems incorporated on remote sensing devices. Such improvements include visibly outlining the energy zone to be measured by a radiometer. This type of infrared thermometer is available from Omega Engineering, Inc. of Stamford, Conn. See also U.S. Pat. No. 6,659,639. In this particular device, the laser is directed in a circular pattern about the energy zone to be measured. There are, however, opportunities to advance the utility of remote sensing devices further. For instance, in situations where the leak or sound point cannot be reached, such as in electrically energized systems, there is a need for a viable approach to search for a leak, arcing, or hotspot. This need is in contrast to the capabilities provided by the prior art in which the laser pointers contemplate a known area of interest.

SUMMARY

Provided is a device for use in locating the origin of a phenomenon of interest, such as a leak, sound, radiation, or the like. The device includes a sensor capable of detecting the presence of the phenomenon of interest and generating a detection signal in response thereto. A phenomenon origin locator, which may include a laser, monitors the detection signal and projects light toward the origin when the detection signal satisfies a selected criteria level, thereby indicating the origin of the phenomenon of interest.

The criteria level may be selectively varied with a level selector and may include physical properties such as amplitude, frequency, temperature, time, light, sound pressure, and/or radiation. A microcontroller may be employed for receiving the detection signal and activating the phenomenon origin locator according to the selected criteria level. The device may also include an output display for producing perceptible output in response to the detection signal in the form of an alphanumeric display, a graphic display, and/or a bar graph.

The sensor may have a field of detection extending along a sensor axis, with the light being projected along a projection axis that is generally parallel to the sensor axis. The device may also include an override switch for manually activating the phenomenon origin locator to assist in aiming the device in a desired direction.

The device may also include a first limit indicator to monitor the detection signal and project light along a first indicator axis when the detection signal satisfies a selected first threshold level of said selected criteria. In addition, the device may include a second limit indicator which monitors the detection signal and projects light along a second indicator axis when the detection signal satisfies a selected second threshold level for said selected criteria. The first and second indicator axis may be collinear with each other as well as collinear with the projection axis.

The sensor may be an acoustic emissions sensor such as a microphonic sensor, or a gas sensor, radiation sensor, infrared sensor, or radio frequency sensor. The sensor may generate an analog detection signal which may be converted to a digital detection signal.

Also provided is a method for locating the origin of a phenomenon of interest broadly comprising sensing the phenomenon of interest, determining whether the sensed phenomenon of interest satisfies selected criteria, and projecting light along a projection axis while the selected criteria is satisfied.

DETAILED DESCRIPTION

Provided herein is a device for use in locating the origin of a phenomenon of interest. The device includes a locater such as a laser pointer for identifying the source of the phenomena of interest, such as a leaking fluid. As described herein the locator, or in this case laser pointer, is activated automatically when the detection device detects a phenomena of interest which satisfies selected criteria. For example, in the case of an ultrasonic leak detector, it would be very advantageous to a person searching for leaks in overhead compressed air or refrigerant gas lines to have the laser pointer turn on to indicate the location where the leak signal is the strongest, thus indicating the location of the leak. As the user scans the lines the laser pointer turns on to indicate the location or origin where a possible leak might exist. This feature enhances the utility of the detector by making it easier to use by less skilled personnel or in situations where the leak or sound point cannot be reached, such as in electrically energized systems.

Figure 1A:
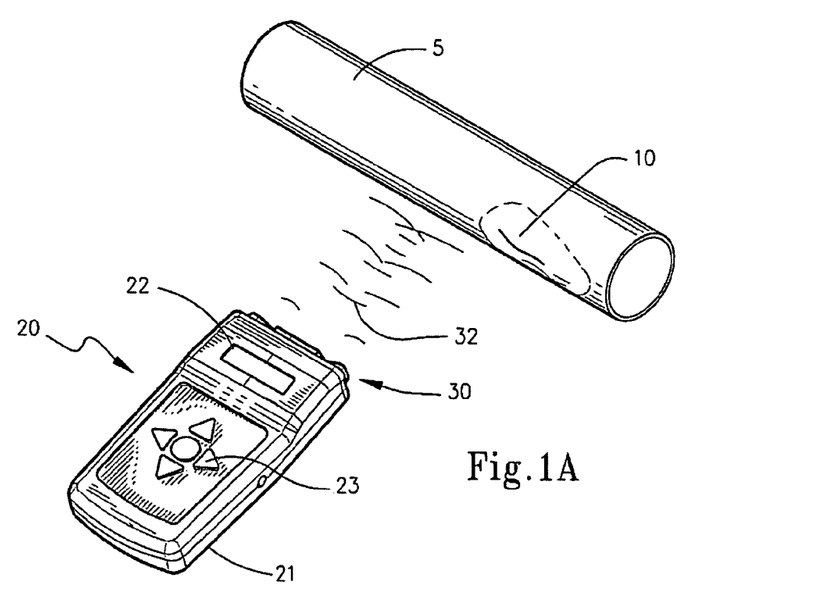
FIG. 1A is a perspective view of a device for use in locating the origin of a phenomenon of interest according to a first exemplary embodiment.
Figure 1B:
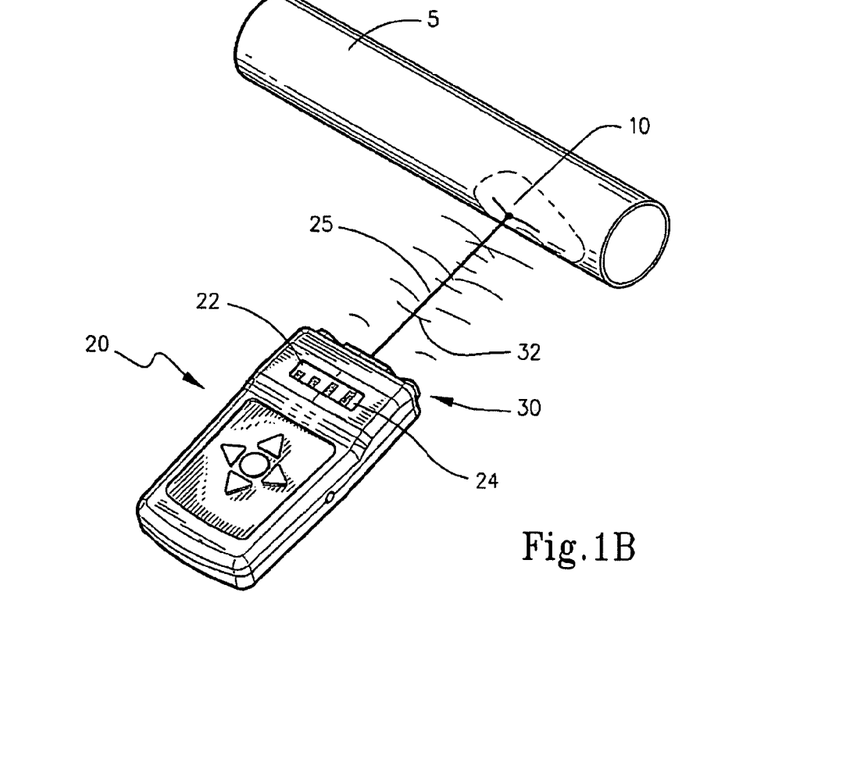
FIG. 1B is a perspective view of the device introduced in FIG. 1A, representatively shown here indicating the location of a leak.

FIGS. 1A and 1B illustrate a first exemplary embodiment of the detection device incorporating a laser pointer locater. Detection device 20 includes a housing 21, a display 22, a sensor 30 and user inputs 23. In this embodiment sensor 30 is a multi-function leak detector, which uses ultrasonic detection as well as ultra-violet light detection to determine leakage from a pipe. For example, as shown in FIG. 1A, pipe 5 has a leak which is illustrated here as crack 10. Leak detection sensor 30 is described in my previous U.S. Pat. No. 7,051,577, the entire disclosure of which is incorporated herein by reference. It should be understood that while in this example a fluid leak is being detected with ultrasonic and ultraviolet detectors, any type of phenomena of interest such as temperature, sound, light, electromagnetic radiation, etc. would be appropriate for this device. Accordingly, various different sensors could be incorporated as well.

In FIG. 1A device 20 is being scanned along pipe 5 in search of a leak shown here as crack 10. However, in FIG. 1A, the sensor has yet to detect crack 10 as exemplified here by emissions 32. FIG. 1B shows that the sensor has detected the leak and activated laser pointer 25 to indicate the origin of the leak. Also shown in FIG. 1B is perceptible output device 22 shown here as a bar graph 24.

Figure 2A:
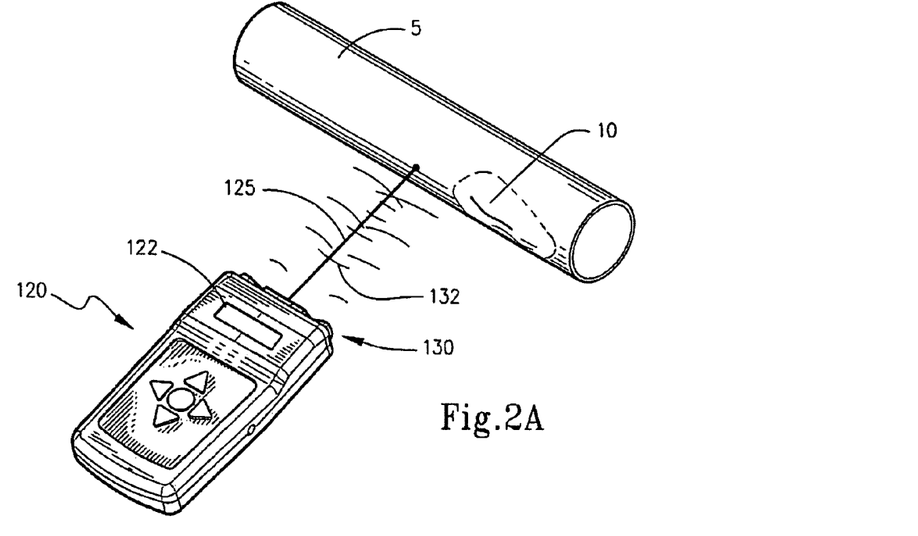
FIG. 2A is a perspective view of a device for use in locating the origin of a phenomenon of interest according to a second exemplary embodiment.
Figures 2B, 12:
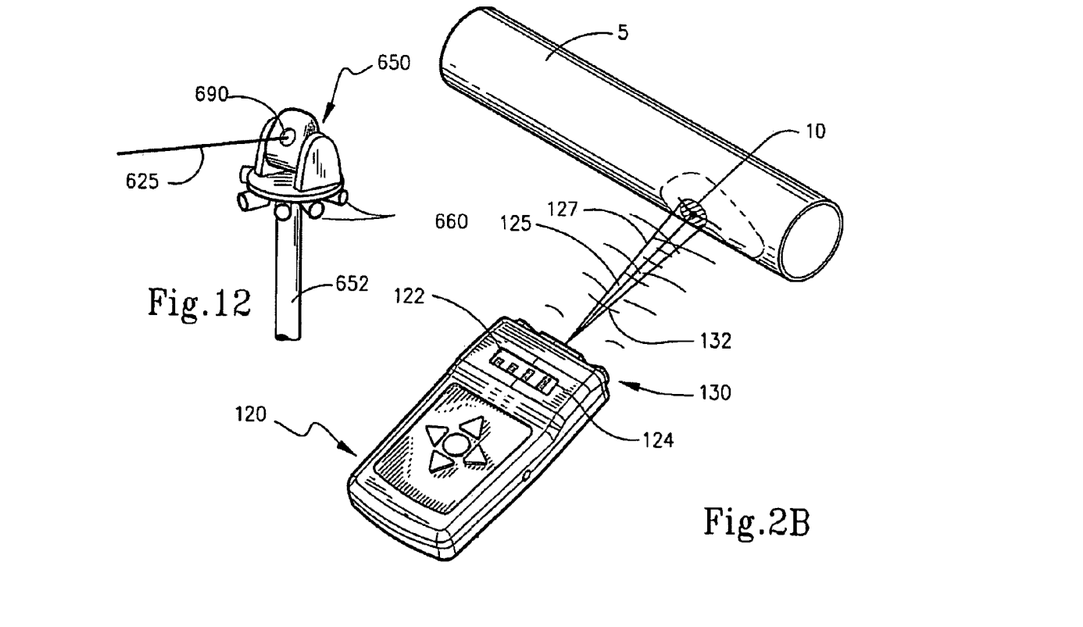
FIG. 2B is a perspective view of the device introduced in FIG. 1A, representatively shown here indicating the location of a leak.
FIG. 12 is a perspective view illustrating representative hardware for implementing the detection device of FIG. 11.

FIGS. 2A and 2B illustrate a second exemplary embodiment of the detection device. In this embodiment, leak detector 120 is similar to that shown in FIGS. 1A and 1B in that it includes a housing 121, a display 122 and a detector 130. However, in this case, laser pointer 125 is activated prior to leak detection to act as a targeting or aiming device. Laser pointer 125 can be activated in this embodiment either manually as desired or as long as leak detector 120 is turned on. FIG. 2B illustrates detection device 120 with the targeting laser 125 activated. This figure also represents that sensor 130 detects the phenomena and accordingly a second laser pointer 127, in this case one which generates a conical beam of light, is also activated indicating the presence of the phenomenon of interest. FIG. 2 also shows the perceptible output 122 displaying a bar graph 124 having a level which is indicative of the strength of the detected leak.

Figure 3:
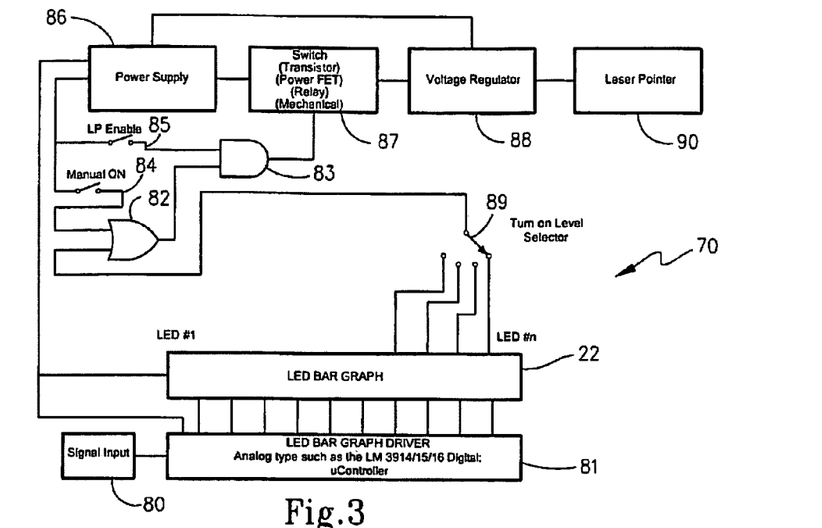
FIG. 3 is a representative block diagram illustrating a first embodiment of circuitry for implementing the device.

FIG. 3 is a block diagram illustrating a representative example of circuitry for implementing the detection device with automatic laser pointer. Circuit 70 includes bar graph driver 81 which is connected to perceptible output, namely bar graph 22. Both the bar graph driver 81 and bar graph 22 receive power from power supply 86. Bar graph driver 81 receives a signal input 80 from a detector that is indicative of the detection level. Bar graph driver 81 drives the bar graph 22 to activate LED's indicative of the level of detection. Circuit 70 also includes a laser pointer enable switch 85. In this embodiment, the laser pointer is activated automatically when the detection level reaches one of the last 4 LED's in bar graph 22, which can be calibrated based on user preferences. Depending on which level is selected on level selector 89, the laser pointer will activate. For instance, as shown in FIG. 3, when the last LED bar is activated in bar graph 22 a signal is transferred to OR gate 82 and then onto AND gate 83, which activates switch 87, which in turn activates voltage regulator 88 to power laser pointer 90. Thus, in order for the laser pointer 90 to be activated, the laser pointer enable switch 85 must be closed and the selected level must be activated by the bar graph 22. The bar graph is for example only and could also be an alphanumeric display, a graphical display, or other suitable device known in the art. Accordingly, the laser pointer could be triggered off of other types of perceptible output devices. Circuit 70 also includes a manual on-switch 84. When manual on-switch 84 is closed, it sends a signal from power supply 86 through OR gate 82 to AND gate 83, which again activates switch 87 thereby ultimately activating laser pointer 90. The particular function of the LED bar graph driver 81 and associated LED bar graph 22 are described more fully in my previous U.S. Pat. No. 5,432,755 the entire disclosure of which is incorporated herein by reference.

Figure 4:
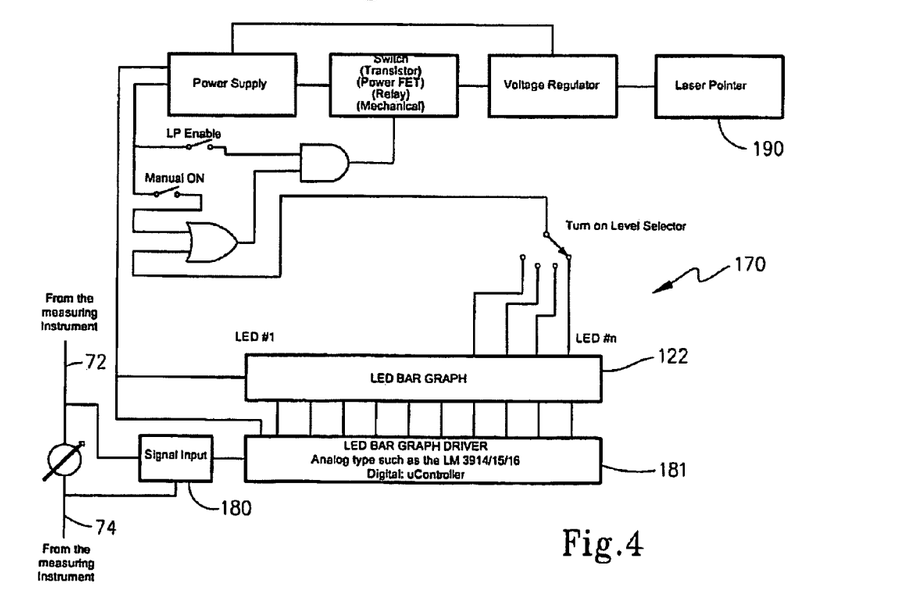
FIG. 4 is a block diagram representing a second embodiment of circuitry for implementing the detection device.

FIG. 4 is a circuit diagram representing a second embodiment of circuitry for implementing the detection device. Circuit 170 is similar to circuit 70 shown in FIG. 3 with the addition of signal input 180, which is adapted to read the voltage or current from an analog style meter such as the ballistic galvanometers found in some instruments. In this case, the current flowing from 72 to 74 determines what level is displayed on the LED bar graph 122 based on bar graph driver 181 output. In this case, the current level from 72 to 74 flowing through the analog meter determines what level is displayed on the LED bar graph 122 based on bar graph driver 181 output.

Figure 5:
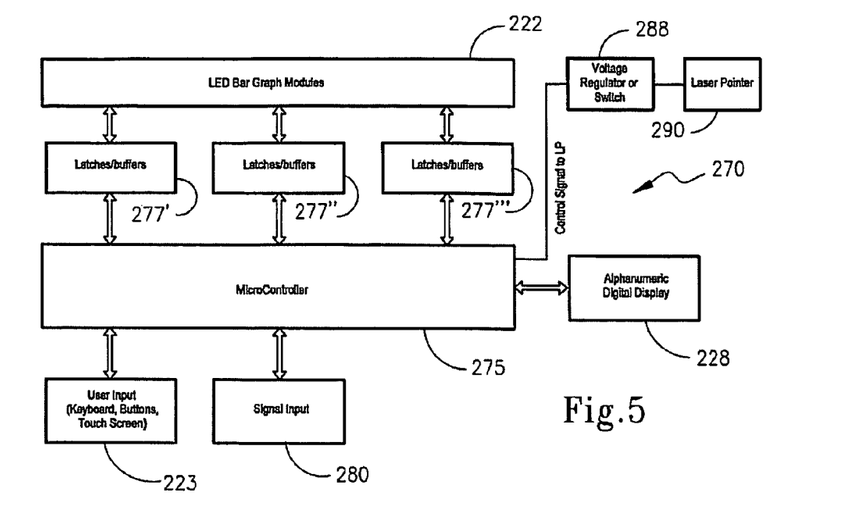
FIG. 5 is a block diagram representing a third embodiment of circuitry for implementing the detection device.

Whereas FIGS. 3 and 4 illustrate analog circuitry for implementing the detection device, FIG. 5 illustrates a circuit 270 that contemplates a digital control system. In this third exemplary embodiment, circuit 270 includes micro-controller 275 which receives signal input 280 and user input 223. The user input could be from a keyboard, buttons, or a touch screen to name a few. As those of ordinary skill in the art would appreciate signal 280 could be any input from a sensor or combination of sensors. User input 223 can be used to input the selected criteria to which the signal input is compared in order to decide whether the laser pointer is to be activated. Micro-controller 275 communicates with alphanumeric digital display 228 to indicate the level of detection. Micro-controller 275 is also connected to latch buffers 277', 277", and 277''', which are in turn connected to LED bar graph modules 222. These latches, however, may be eliminated if the microcontroller has the ability to drive the LEDs directly. Micro-controller 275 is connected to voltage regulator/switch 288, which controls laser pointer 290. Thus, if signal input 280 satisfies the selected criteria, which is input via user input 223, then micro-controller 275 would activate the alphanumeric digital display displaying the level of detection on display 228. Also, microcontroller 275 would activate the appropriate latches or buffers 277', 277", and 277''', which in turn activate LED bar graph modules 222. The micro-controller circuitry is explained further in my previous U.S. Pat. No. 6,163,504 the entire disclosure of which is incorporated herein by reference.

Figure 6:
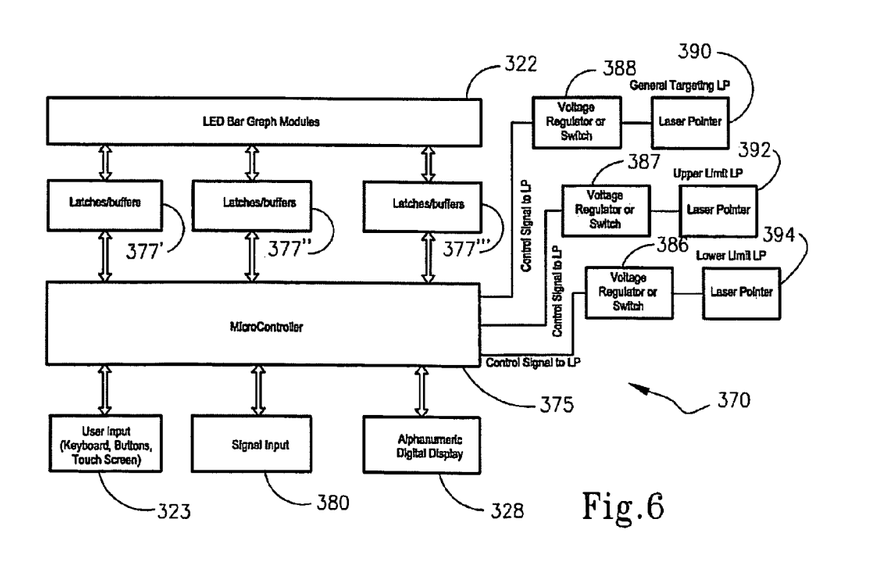
FIG. 6 is a block diagram representing a fourth embodiment of circuitry for implementing the detection device.

FIG. 6 illustrates a fourth embodiment of circuitry for implementing the detection device with locator. This locator incorporates multiple laser pointers of the same or different color to indicate different leaks, temperatures, radiations, or other conditions. For example, a detector can have a targeting laser pointer, which is on when the device is ON, which indicates the direction and point of interest. However, when the trigger conditions are met, other laser pointers having different characteristics (e.g., different colors and/or spot and/or shapes) will turn on to indicate the spot where the detector has detected a leak or sound of interest. In an IR thermometer, for example, the second laser pointer can be blue and turn on for example when a lower limit in temperature is met, with the upper limit being indicated with a red laser pointer. These colors naturally can be any available colors. The locators can be made to pulsate based on certain criteria as well. In a thermography instrument, as another example, additional laser pointers can be activated to indicate the location where a temperature condition exists such as HI, LOW, Average, Specific Value, Difference, or Rate of Change.

Circuit 370 (FIG. 6) is similar to circuit 270 shown in FIG. 5 with the addition of an upper-limit laser pointer and a lower-limit laser pointer in addition to the general targeting laser pointer 390. In this embodiment, the detection device has a targeting laser pointer 390 which can be activated manually or with the activation of the device. In addition, the targeting laser pointer may be activated only when the selected criteria have been met. The user may input three criteria via user input 323 in order to activate the targeting and upper and lower limit laser pointers 390, 392 and 394 respectively. The target criteria as well as the upper-limit and lower-limit criteria are described more fully below with respect to FIGS. 9 and 10.

Figure 7:
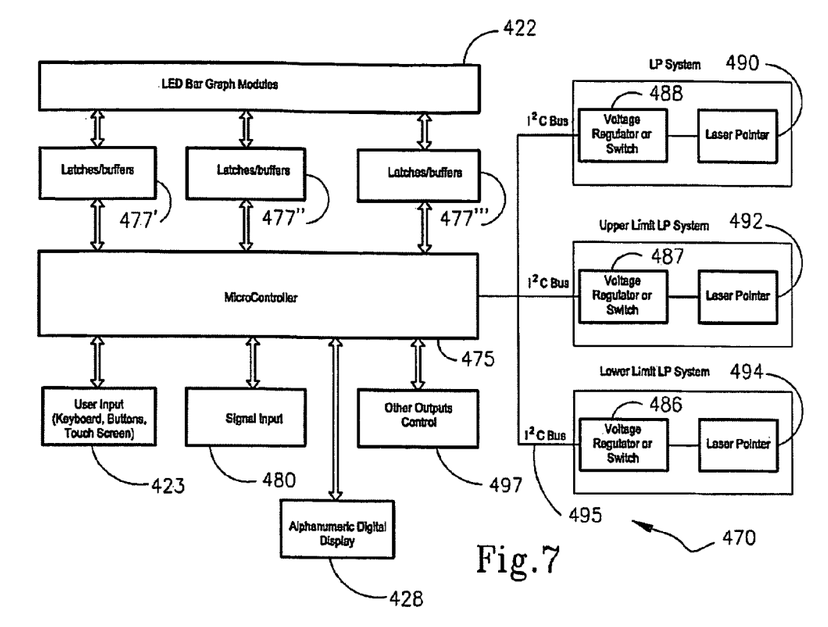
FIG. 7 is a block diagram representing a fifth embodiment of circuitry for implementing the detection device.

FIG. 7 illustrates a fifth embodiment of circuitry for implementing the device. Circuit 470 is similar to circuit 370 shown in FIG. 6, however, in this case the laser pointers are connected to microcontroller 475 via an i²c bus 495 as is known in the art. Also, circuit 470 includes alternate or other output control 497, which may be used for connecting to an oscilloscope, for example.

Figure 8:
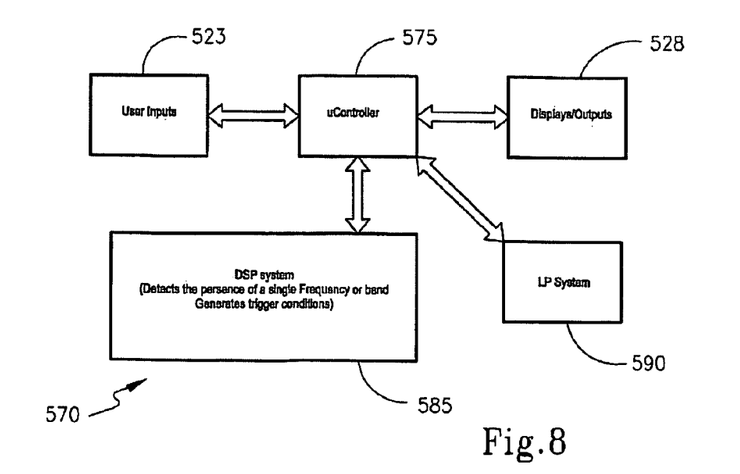
FIG. 8 is a block diagram representing a sixth embodiment of circuitry for implementing the detection device.

FIG. 8 is a circuit diagram representing a sixth embodiment of a circuit for implementing the detection device. In this embodiment, digital signal processing (DSP) system 585 receives the signal from the detector, such as 280 in FIG. 5, and processes the signal to detect the presence of a single frequency or band. Micro-controller 575 receives a trigger signal from the DSP system 585. Micro-controller 575 in turn displays output on output device 528 and activates the laser pointer system 590, which includes laser pointers and voltage regulators/switches as described with respect to FIG. 7. The digital signal processing system is described more fully in my earlier U.S. Pat. No. 7,051,577.

Figure 9:
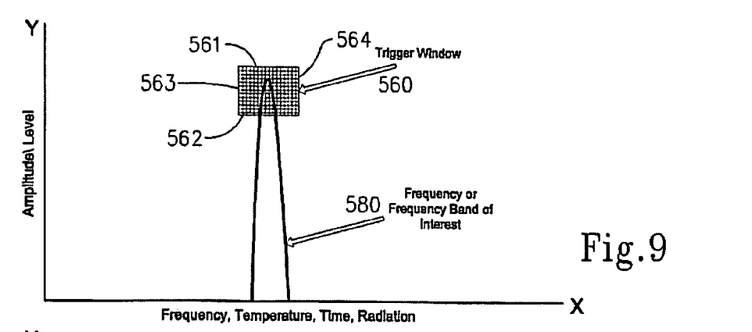
FIG. 9 is a graph illustrating a first exemplary criteria schema shown here as a trigger window.

With respect to the selected criteria referred to in the above embodiments, there are several criteria schemas contemplated. These criteria schemas are discussed in some detail with reference to FIGS. 9 and 10, which are graphs of amplitude versus frequency, temperature, time, and radiation, as representative examples only. FIG. 9 illustrates a trigger window 560, which as shown here will only trigger the laser pointer if the detected phenomena, shown in the X-axis, are within a certain frequency band and a certain amplitude range. This is a condition-based trigger, which can become very sophisticated depending on the type of detector and the phenomenon of interest. When spectral analysis is performed within the instrument and a specific frequency, or frequency band is detected that the user is interested in or is associated with a specific leak, the DSP system (as described above) will turn the locator on only when this condition exists, ignoring competing sounds and sound intensities. FIG. 9 is a graph, which plots the phenomena of interest (i.e. frequency, temperature, time, or radiation) along the X-axis versus the amplitude of the signal on the Y-axis. For purposes of discussion assume input signal 580 is a frequency signal. In this case, then, input signal 580 has a particular frequency and amplitude. Illustrated here, input signal 580 satisfies the criteria, or in this case, trigger window 560. Trigger window 560 is represented in this case as a box with boundaries corresponding to amplitude and frequency. For instance, the trigger window is bounded on its upper and lower sides by amplitude levels 561 and 562 respectively. The trigger window is bounded on its front and backsides by frequency levels 564 and 563. In this illustration, frequency signal 580 falls within the upper and lower amplitude bounds 561 and 562 respectively, as well as upper and lower frequency boundaries 563 and 564; thus the phenomenon of interest locater (laser pointer) would be activated.

Focusing parabolic horns, parabolic reflector dishes or Fresnel lenses can be used to make a detector, particularly an ultrasonic leak detector, very directional and able to focus on a small target area. In industrial leak detection again, in overhead lines of either compressed air or refrigerants and in situations where multiple leaks are present in a relatively small area, one might be interested in locating a leak that is smaller than the surrounding ones but because of the type of gas that might be leaking it might be more important to know (flammable gas for instance). In such cases the user can program the device to turn on at a threshold point, for example 5, and turn off at 15.

Figure 10:
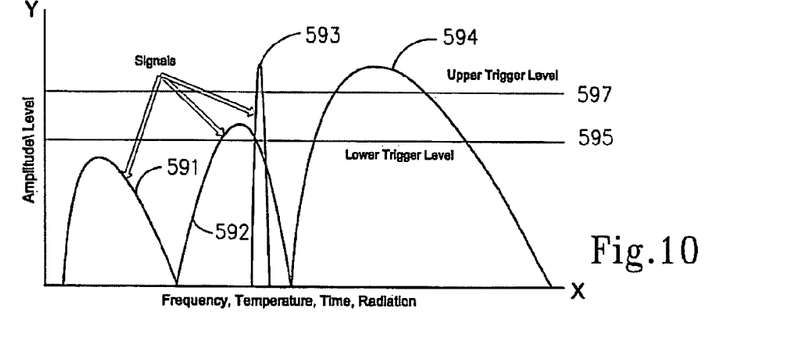
FIG. 10 is a graph illustrating a second exemplary criteria schema shown here as upper and lower trigger levels.

FIG. 10 represents a second schema for selected criteria upon which the laser pointer is activated. FIG. 10 is a graph which plots frequency on the X-axis versus amplitude on the Y-axis. The criteria in this case are upper trigger level 597 and lower trigger level 595 represented here as horizontal lines at a particular amplitude level. Accordingly, regardless of the frequency level of the input signal (591, 592, 593, and 594) the laser pointer will be activated as long as the signal reaches the lower and/or upper trigger levels. So for instance, signal 591 would not activate either the lower trigger level or the upper trigger level. However, signal 592 reaches the lower trigger level 595 and would thus trigger lower level laser pointer as is described above with reference to FIGS. 6 and 7, for example. Signals 593 and 594 would activate both lower and upper trigger levels 595 and 597 respectively. It should be understood that the criteria schemas illustrated in FIGS. 9 and 10 are for exemplary purposes only and other trigger windows and levels could be defined in keeping with the spirit of the described schemas. Furthermore, the upper and lower limits and frequencies could be selected by a user via an input device such as a keyboard or touch screen, for instance. Additionally, a display schema such as a combination of current level indication and peak hold can be implemented. The laser pointer can be activated at a set point and follow the peaks of the signal of interest. For example, activation may be set at LED 7 and made to follow the peak hold until the peak hold resets. If the new peak is above the set point, the laser pointer will remain ON. If it drops below the set point, the laser pointer will go OFF.

Figure 11:
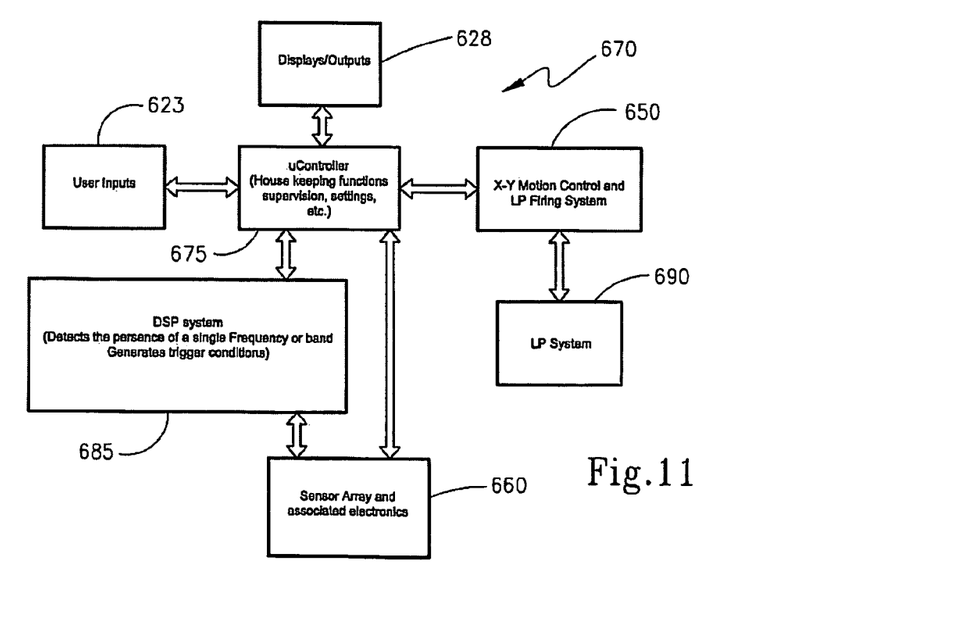
FIG. 11 is a representative block diagram for implementing another embodiment of the detection device, which is mounted on a motorized system.

FIG. 11 is a representative block diagram of a circuit for implementing another embodiment of the detection device, which is mounted on a motorized system which can move to point to any location in three-dimensional space (see FIG. 12). In this embodiment, circuitry 670 is similar to that shown in FIG. 8 with the addition of an XYZ motion control and laser pointer firing system 650 as well as sensor array 660. Shown in FIG. 12 is such a system where the sensor array 660 is mounted underneath the XYZ motion control 650. Both sensor arrays 660 and motion controller 650 are mounted on pole 652. It is contemplated that the system could be mounted on pole 652 in an industrial environment, such as for example, a petroleum pumping station or a refinery. Sensor array 660 would detect any leaks and communicate via circuitry 670 to the laser pointing system 650 in order to target the leak origin. Assuming the detected leak meets the selected criteria, laser pointer 690 would fire beam 625 toward the origin of the leak, thereby indicating its location. It should be understood that the location and configuration of the sensor array may vary and the configuration shown is for example only. For instance, the sensor arrays could also be arranged in phased array lattices.

With the above embodiments in mind, also contemplated are methods of locating a phenomenon of interest. One such method may include any steps inherent in any of the disclosed embodiments. The method broadly includes sensing the phenomenon of interest, determining whether the sensed phenomenon satisfies selected criteria, and projecting light along a sensor axis while the criteria is satisfied. Methods can also include multiple locators and criteria for indicating conditions that meet various selected criteria.

Although the exemplary embodiments of the present invention have been described in some detail above, it should be appreciated that the present invention is defined by the following claims construed in light of the prior art such that modifications or changes may be made to the exemplary embodiments without departing from the inventive concepts contained herein.

I claim:

1. A device for use in locating the origin of a phenomenon of interest, comprising:
   a) a sensor having a field of detection extending along a sensor axis, said sensor capable of detecting presence of the phenomenon of interest and generating a detection signal in response thereto;
   b) a phenomenon origin locator to monitor the detection signal and project light along a projection axis that is generally parallel to said sensor axis when the detection signal satisfies a selected criteria level, thereby indicating the origin of the phenomenon of interest;
   c) a first level indicator to monitor the detection signal and project light along a first indicator axis when the detection signal satisfies a selected first threshold level of said selected criteria; and
   d) a second level indicator to monitor the detection signal and project light along a second indicator axis when the detection signal satisfies a selected second threshold level for said selected criteria.

2. A device according to claim 1 wherein said first and second indicator axis are parallel.

3. A device according to claim 2 wherein said projection axis and said first and second indicator axis are parallel.

4. In a portable radiation measurement instrument having an instrument housing, a radiation sensor supported relative to said instrument housing that is operative upon exposure to a radiation source to produce a corresponding radiation detection signal, the improvement comprising:
   a plurality of radiation source locators each being associated with a selected threshold criteria and operative to monitor the radiation detection signal and project light toward the origin of the radiation source when the radiation detection signal satisfies the radiation source locator's selected threshold criteria.

5. The improvement according to claim 4 wherein said radiation is infrared (IR) radiation.

6. The improvement according to claim 4 wherein said radiation is radio frequency (RF) radiation.

7. The improvement according to claim 4 wherein said portable radiation measurement instrument is a handheld radiation measurement instrument.

* * * * *